J. G. JOHNSON.
SEED GATHERER.
APPLICATION FILED JUNE 1, 1916.
1,212,644.
Patented Jan. 16, 1917.
2 SHEETS—SHEET 2.
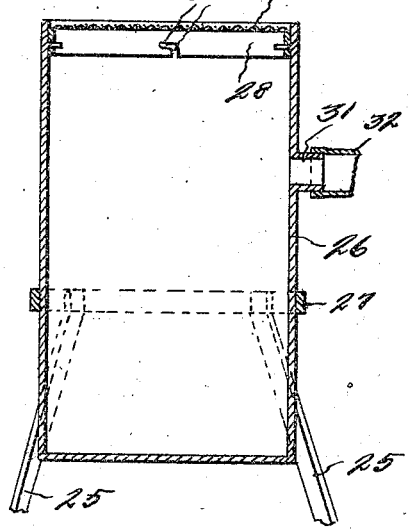
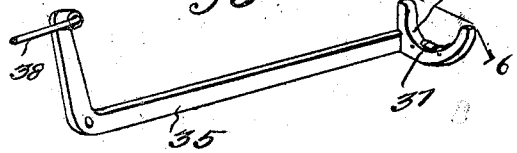
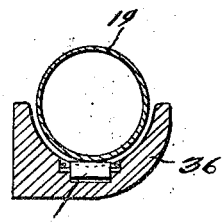
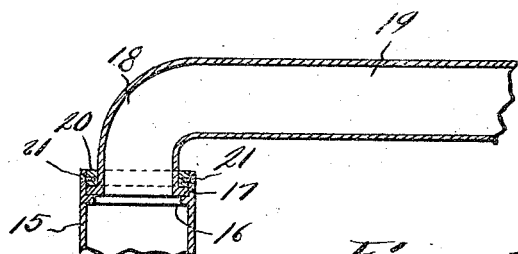
Inventor
J. G. Johnson
By D. Swift & Co.
Attorneys
Witnesses

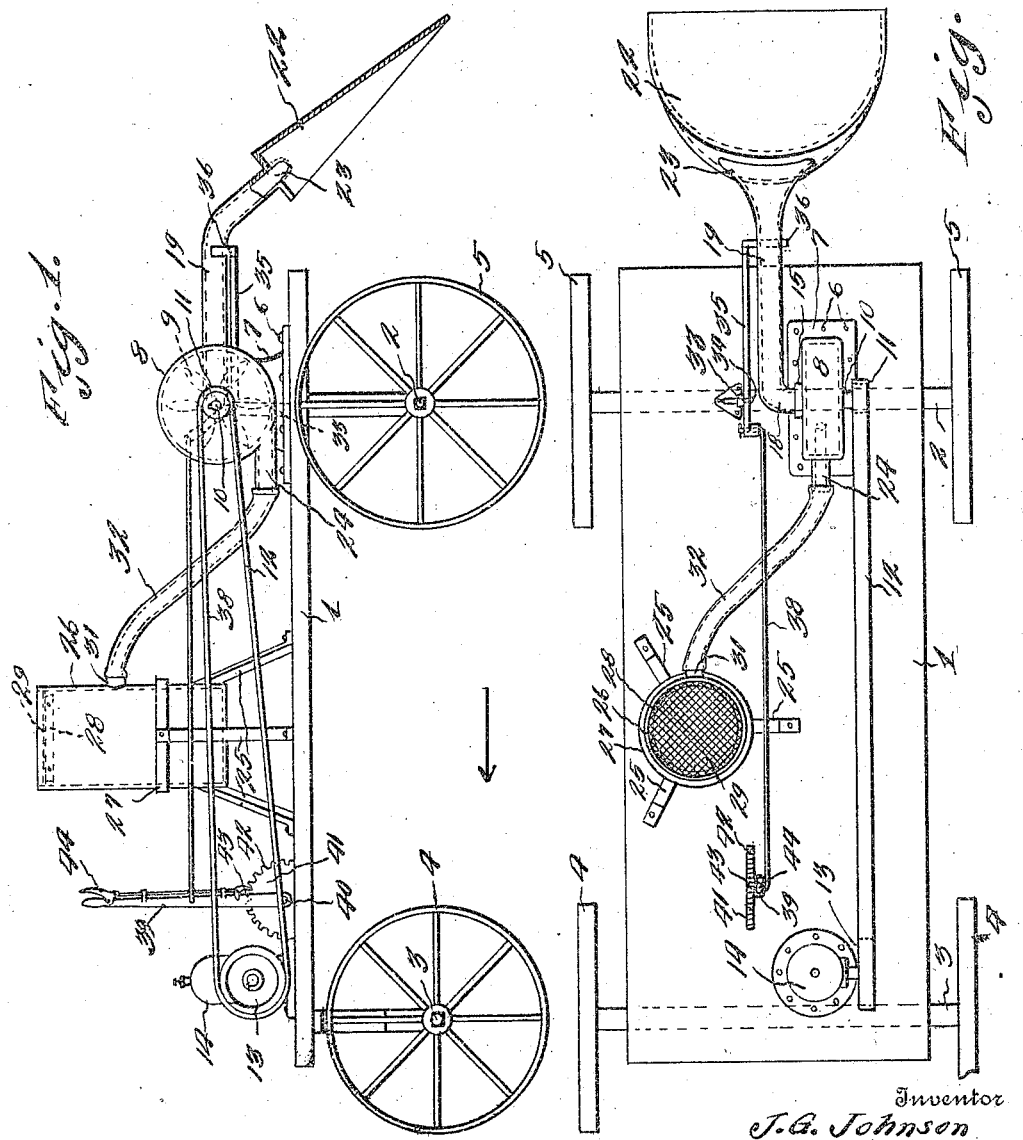

UNITED STATES PATENT OFFICE.

JOSEPH G. JOHNSON, OF EUSTIS, FLORIDA.

SEED-GATHERER.

1,212,644.

Specification of Letters Patent.   Patented Jan. 16, 1917.

Application filed June 1, 1916.   Serial No. 101,082.

*To all whom it may concern:*

Be it known that I, JOSEPH G. JOHNSON, a citizen of the United States, residing at Eustis, in the county of Lake, State of Florida, have invented a new and useful Seed-Gatherer; and I do hereby declare the following to be a full, clear, and exact description of the invention, such as will enable others skilled in the art to which it appertains to make and use the same.

This invention relates to the art of seed gathering or picking machines, and more especially to an improved pneumatic machine for gathering various seeds, particularly hay seed and the like.

One of the objects of the invention is to provide a tubular arm pivotally carried upon the side of a pneumatic device, and having a fan-shaped suction member at its free end, to drag over the tops of the crop such as hay or the like, so as to suck the seed through the arm, and thence through the pneumatic means, and finally into a suitable receptacle.

Another object of the invention is the provision of suitable means for raising and lowering the arm, whereby the fan-shaped suction member may be adjusted according to the height of the crop.

In practical fields the details of construction may necessitate alterations, falling within the scope of what is claimed.

The invention comprises further features in combination parts, as hereinafter set forth, shown in the drawings, and claimed.

In the drawings:—Figure 1 is a view in side elevation of the seed gathering machine constructed in accordance with the invention. Fig. 2 is a view in plan of the improved machinery. Fig. 3 is a vertical sectional view of the seed receptacle, into which the seeds are pneumatically blown. Fig. 4 is a sectional view through the pivotal joint of the pneumatic suction arm. Fig. 5 is a detail perspective view of a pivoted lever for raising the pneumatic arm. Fig. 6 is a sectional view on line 6—6 of Fig. 5, through the semi-circular end portion of the raising lever.

Referring more especially to the drawings 1 designates a suitable platform, which is mounted upon suitable axles 2 and 3 having forward and rear supporting wheels, 4 and 5, the framework thus formed being designed to travel in the direction of the arrow in Fig. 1. Secured on the platform 1 by means of suitable bolts 6 is the base 7 of the casing 8, in which a fan 9 is journaled in suitable bearings. On one end of the shaft 10 of said fan is a pulley 11, about which a strap 12 travels. This belt 12 in turn passes about a pulley 13, which is carried by the shaft of the motor 14, by which power is transmitted to the belt, and thence to the fan. One side of the casing 8 of the fan is provided with a tubular extension 15. The interior surface of this extension near its outer end is provided with an annular rib 16. Arranged adjacent the rib 16 is the flanged end 17 of the elbow end 18 of a tubular arm 19, there being an annular ring 20 secured in the extreme end of the extension 15 by the screws 21, thereby holding the tubular arm swivelly mounted, whereby the arm may be raised and lowered. The free end portion of the arm 19 terminates in a broad fan-like seed suction member 22. Where the arm merges into the member 22 an opening 23 is provided, which opening is elongated in a transverse direction, so that as the member 22 drags over the tops of the crop, the seed thereof will be drawn or sucked into and through the arm 19, where the fan will blow the same out through the extension 24 of said casing 8.

By means of supporting legs 25 a suitable cylindrical receptacle 26 is supported upon the platform 1. A band 27 is carried by the upper ends of the legs 25, and through which band the receptacle 26 is arranged. A suitable ring 28 carrying a piece of wire fabric 29 is detachably secured in the upper end of the receptacle, by means of an angular slot and pin connection 30. This receptacle 26 has a lateral extension 31, and connected thereto is a flexible tube or hose 32, which in turn is connected to the extension 24. The piece of mesh work 29 or wire fabric, is of such mesh, that when the seed and the like or motes are blown into the receptacle, the greater portion of the motes and trash (somewhat lighter and a trifle finer than the seed) are blown out through the wire fabric, while the seed deposit into the receptacle.

A bracket 33 is secured upon the platform 1, and mounted in a bearing of the vertical part of said bracket is a pivot pin 34, on which an angular lever 35 is pivotally mounted. The free end of the longer arm of the lever 35 terminates in a laterally extending member 36, which is semi-circular in elevation, so as to arch under the tubular arm 19. An anti-frictional roller 37 is mounted in the crotch of the semi-circular member 36, so as to roll upon the under surface of the tubular arm, as the lever 35 is raised or lowered pivotally. Connected to the shorter arm of the lever 35 is a rod 38, which in turn is connected to a lever 39 pivoted at 40 to a segmental plate 41, which is carried by the platform 1 and is provided with teeth 42. By moving the lever 39 to and fro, the lever 35 will be tilted on its pivot, so as to raise and lower the arm 19, whereby the member 22 may be accommodated to crops of different heights. The lever 39 is held in different adjusted positions by means of the dog 43, which may be manipulated by the hand-grip 44, when it is desired to move said lever 39.

The invention having been set forth what is claimed as new and useful is:—

In a seed gathering machine, the combination of a wheel supported frame and a receptacle thereon, of a pneumatic device mounted upon the frame and having a pipe communicating with the receptacle, a tubular suction arm pivotally carried by the casing of the pneumatic device, said arm having at its free end a broad fan-like suction member to drag over the tops of the crop, whereby the seed may be sucked through the arm into the pneumatic device and blown into said receptacle, and means for raising and lowering said arm, said means comprising a pivoted bell crank lever having a long and short arm, the free end portion of the long arm terminating in a semi-circular member fitting under the lower part of the tubular suction arm, and having an anti-frictional roller to engage the arm and means connected to the short arm for raising and lowering said bell crank lever.

In testimony whereof I have signed my name to this specification in the presence of two subscribing witnesses.

JOSEPH G. JOHNSON.

Witnesses:
 H. F. SELF,
 B. G. PORTER.